United States Patent
Havermann et al.

(10) Patent No.: US 12,512,874 B2
(45) Date of Patent: Dec. 30, 2025

(54) MODULE WITH AN INTEGRATED WLAN ETHERNET DATA INTERFACE

(71) Applicant: HARTING CUSTOMISED SOLUTIONS GMBH & CO. KG, Espelkamp (DE)

(72) Inventors: Gert Havermann, Wallenhorst (DE); Matthias Wiehe, Lübbecke (DE); Mirco Hilla, Minden (DE); Jens Krause, Fulda (DE); Michael Droste, Hille (DE)

(73) Assignee: HARTING CUSTOMISED SOLUTIONS GMBH & CO. KG, Espelkamp (DE)

( * ) Notice: Subject to any disclaimer, the term of this patent is extended or adjusted under 35 U.S.C. 154(b) by 190 days.

(21) Appl. No.: 18/570,036

(22) PCT Filed: May 30, 2022

(86) PCT No.: PCT/DE2022/100405
§ 371 (c)(1),
(2) Date: Dec. 13, 2023

(87) PCT Pub. No.: WO2022/262898
PCT Pub. Date: Dec. 22, 2022

(65) Prior Publication Data
US 2024/0283486 A1 Aug. 22, 2024

(30) Foreign Application Priority Data
Jun. 14, 2021 (DE) ...................... 10 2021 115 310.7

(51) Int. Cl.
*H04B 5/26* (2024.01)
*B61L 15/00* (2006.01)
*H01Q 7/00* (2006.01)

(52) U.S. Cl.
CPC ............. *H04B 5/26* (2024.01); *B61L 15/0027* (2013.01); *H01Q 7/00* (2013.01); *H04B 5/266* (2024.01)

(58) Field of Classification Search
CPC ........... B61L 15/0027; H01F 2038/143; H01F 27/2804; H01F 38/14; H01Q 7/00; H04B 5/26; H04B 5/266; H04B 5/72
See application file for complete search history.

(56) References Cited

U.S. PATENT DOCUMENTS

| | | | |
|---|---|---|---|
| 7,420,800 B1* | 9/2008 | Knapp ................... | G06F 1/186 361/679.55 |
| 12,206,164 B2* | 1/2025 | Kim ........................ | H01Q 5/50 |

(Continued)

FOREIGN PATENT DOCUMENTS

| | | |
|---|---|---|
| DE | 102011079551 A1 | 1/2013 |
| DE | 102016205586 A1 | 10/2017 |

(Continued)

OTHER PUBLICATIONS

International Search Report and Written Opinion, mailed Sep. 8, 2022, for International Patent Application No. PCT/DE2022/100405. (13 pages) (with English translation of International Search Report).

(Continued)

*Primary Examiner* — Thien M Le
(74) *Attorney, Agent, or Firm* — Seed Intellectual Property Group LLP (57) ABSTRACT

An antenna for a WLAN Ethernet data interface is provided, having a rectangular printed circuit board, wherein a signal line and a reference ground are each provided on the printed circuit board by a suitably designed conductor track, and the signal line is designed as a planar coil on a first side, and wherein the antenna comprises a region for providing a magnetic coupling state, suitable for data transmission, of a (Continued)

first antenna with a structurally identical second antenna, which region is designed in such a way that the magnetic coupling state is provided by an adjacent arrangement of the region of the first and of the second antenna, wherein the antennas are each rotated through 180° in relation to one another in the coupling state. A module with an integrated WLAN Ethernet data interface, having a housing, a shielding element, a positioning element and/or a protective cap, and having a suitable antenna is also provided.

18 Claims, 7 Drawing Sheets

(56) References Cited

U.S. PATENT DOCUMENTS

| | | | |
|---|---|---|---|
| 2006/0017645 A1* | 1/2006 | Deng | H01Q 9/04 343/702 |
| 2016/0149305 A1 | 5/2016 | Jeon et al. | |
| 2016/0171201 A1* | 6/2016 | Schröder | H04W 4/80 726/20 |
| 2016/0182130 A1* | 6/2016 | Ahmed | H04B 5/26 455/41.1 |
| 2019/0027857 A1 | 1/2019 | Narberhaus | |
| 2021/0012957 A1 | 1/2021 | Geissler et al. | |
| 2022/0007485 A1* | 1/2022 | Barth | H05B 47/19 |
| 2022/0354033 A1* | 11/2022 | Powell, Jr. | H02J 50/005 |
| 2022/0391344 A1* | 12/2022 | Aurongzeb | A63F 13/235 |
| 2023/0118127 A1* | 4/2023 | Ramasamy | H04B 7/0691 375/267 |
| 2023/0225083 A1* | 7/2023 | He | G06F 1/203 361/688 |
| 2024/0162749 A1* | 5/2024 | Wu | H02J 50/90 |
| 2025/0177762 A1* | 6/2025 | Villamil | A61N 1/3787 |
| 2025/0183732 A1* | 6/2025 | AbuKhalaf | H02J 7/00034 |

FOREIGN PATENT DOCUMENTS

| | | |
|---|---|---|
| DE | 102019118712 A1 | 1/2021 |
| EP | 2616304 B1 | 5/2017 |
| EP | 3011643 B1 | 8/2017 |
| TW | 200701558 A | 1/2007 |

OTHER PUBLICATIONS

Office Action, dated May 6, 2022, for German Patent Application No. 10 2021 115 310.7 (6 pages).

International Preliminary Report on Patentability, dated Dec. 14, 2023, for International Patent Application No. PCT/DE2022/100405. (8 pages).

* cited by examiner

MODULE WITH AN INTEGRATED WLAN ETHERNET DATA INTERFACE

BACKGROUND

Technical Field

Embodiments of the present disclosure relate to a module of a module support, wherein the module is provided with a WLAN Ethernet data interface. An antenna suitable for the module and a module suitable for a plug-in connector and/or an electric coupler is also provided.

Plug-in connector modules are required in order to construct modular plug-in connectors. In this case, the plug-in connector modules accommodate modular contact inserts, and a plurality of plug-in connector modules which have similar or different contact inserts are combined to form a plug-in connector. The plug-in connector can therefore be assembled and configured with a high degree of flexibility.

In this case, plug-in connector modules are either inserted directly into a plug-in connector housing or first inserted and fixed in the module frame. The module frame is then fitted into the plug-in connector housing together with the plug-in connector modules received in it.

A large number of plug-in connector modules for modular plug-in connectors are known from the prior art. They vary in terms of their size, number of received contact means, dimensioning of the contact means and type of contact means. Depending on the configuration of the plug-in connector module, they can be used for transmitting, for example, signals and currents of a digital, analog, electrical, pneumatic, mechanical, optical or hydraulic type.

As digitization increases, it becomes necessary to transfer a continuously growing amount of information. Interfaces for radiofrequency signal and data transfer can be implemented by plug-in connections, as are known, for example, from Ethernet cables. However, plug-in connectors of this kind are not suitable for many, in particular industrial, areas or outdoor use since they would very quickly become inoperative due to the unavoidable soiling during use thereof.

The prior art therefore discloses, for example in the case of an electric coupler for trains, establishing the radiofrequency data transfer by means of a radio link from one car to the next or from the railcar of one train part to the railcar of a second train part.

Description of the Related Art

For example, the document EP 3 011 643 B1 describes a holding frame for plug-in connector modules, in which the holding frame for a plurality of different plug-in connector modules can be inserted in a manner combined as desired in order to be able to provide a plug-in connector of modular design. The holding frame holds the plug-in connector modules together and fixes them to each other. The holding frame can then be inserted into a plug-in connector housing and fixed in it. The plug-in connector can be connected to a matching, likewise modular mating plug-in connector. As an alternative, the holding frame can be inserted and fastened to a housing or device wall as a so-called mounting frame.

A large number of individual plug-in connectors can be combined and assembled with this type of modular plug-in connector. Various, standardized plug-in connector modules are required for this purpose.

The document EP 2 616 304 B1 discloses an electric coupler for trains, having a first and a second coupler part which each have a support in which a plurality of coupling parts are arranged, it being possible for electrical, pneumatic and/or hydraulic coupling from one coupler part to another coupler part to be established using said coupling parts, with radiofrequency coupling being provided. The radiofrequency coupling is formed by an antenna in one coupler part and an antenna in the other coupler part, wherein the radiofrequency coupling has two radiofrequency coupling parts that interact with each other and are each designed as a plastic body which completely encloses the antenna.

The known high-frequency coupling, which is designed as a loop antenna, such as a replacement for existing interfaces for radiofrequency signal and data transfer by plug-in connections, including in the case of an electric coupler for trains, can be retrofitted and scaled only in a disadvantageously complicated manner.

The German Patent and Trademark Office has searched the following prior art in the priority application in respect of the present application: US 2016/0 149 305 A1.

BRIEF SUMMARY

Embodiments of the disclosure provide a WLAN Ethernet data interface suitable for a large number of applications and, in particular, can be installed and retrofitted in a simple manner. Some embodiments provide an antenna suitable for the WLAN Ethernet data interface.

Some embodiments relate to an antenna for a WLAN Ethernet data interface having a printed circuit board on which elements of a near-field antenna are designed as conductor tracks and which is designed in such a way that it interacts with a second structurally identical antenna as intended in such a way that high-speed data transfer is provided.

Printed circuit boards are cost-effective to produce, even in large numbers. The provision of a wireless data interface by two structurally identical interfaces that interact with each other is likewise advantageous in terms of production and allows simple installation in a large number of applications.

Antennas provided on a printed circuit board are also particularly space-saving and flexible in terms of use owing to their substantially two-dimensional design.

A signal line and a first and a second reference ground, each provided by conductor tracks of suitable design, are provided in a first region on the first side of the printed circuit board of the antenna. Following the first region, the signal line is designed in a suitable manner as a planar coil in a second region of the printed circuit board.

In some embodiments, the second region of the printed circuit board may include a third region for providing a magnetic coupling state, which is suitable for data transfer, of a first antenna with a structurally identical second antenna, which third region is advantageously designed in such a way that the magnetic coupling state is provided by an adjacent arrangement of the third region of the structurally identical first and second antenna.

The antenna may be designed in a manner suitable for this purpose in such a way that the magnetic coupling state is provided when the two adjacent third regions are arranged with a small spacing of 1 to 10 mm and, advantageously, approximately 2.5 mm, without touching in the process.

In some embodiments, the conductor tracks on the printed circuit board may be advantageously designed with the signal line in such a way that the two antennas are each rotated through 180° in relation to one another in the coupling state. This arrangement of the antennas is also particularly space-saving.

The coil of the signal line may be designed in a manner suitable for this purpose as a planar, spiral rectangular coil with at least one turn and can have three to five turns for providing desirably reliable and powerful coupling.

In some embodiments, the design of the coil as a rectangular coil allows a desirable magnetic coupling state to be achieved by adjacent arrangement of only selected regions of the coils of the two antennas. This allows provision of the magnetic coupling state in a space-saving and simple manner.

For this purpose, the third region provided for the coupling may be provided in a suitable manner at an edge of the printed circuit board and in this case comprises a predetermined region of the coil, which region is provided to provide the magnetic coupling.

The coil may be designed in a manner suitable for this purpose in such a way that the turns of the coil each have at least one first section parallel to a longitudinal direction of the printed circuit board and at least one second section transverse to the first section, wherein the third region provided at an edge of the printed circuit board comprises at least one second section and preferably two or three second sections of the coil.

For an impedance in the region of 50Ω of a cable connection of the antenna which is desirable for WLAN/Ethernet compatibility, the signal line extends, starting from a cable connection which is arranged at an edge of the printed circuit board, in the first region of the printed circuit board centrally between a first and a second reference ground which are each arranged adjacent to opposite longitudinal-side edges of the printed circuit board in a suitable manner.

The printed circuit board with the abovementioned edges may be of rectangular design in a suitable manner here, wherein the third region and the cable connection are provided on respectively opposite broad-side edges of the printed circuit board. The cable connection is suitable for connection of a coaxial cable.

On the first side of the printed circuit board, a first width of the signal line, a spacing of the signal line from the first and the second reference ground and a width of the reference grounds are each designed in such a way that the first region is populated by the signal line and the reference grounds for providing a suitable impedance of the cable connection of the antenna in the first region of the printed circuit board.

In a suitable manner for this purpose, the signal line has, in the first region of the printed circuit board, a width which corresponds to approximately its spacing from the first and the second reference ground, wherein the width of the reference grounds advantageously corresponds to approximately 1.2 to 2 times and preferably approximately 1.5 times the width of the signal line. The first and the second reference ground are each areally designed in the form of a rectangle extending in the longitudinal direction of the printed circuit board here.

In contrast to the abovementioned first region, the signal line, in the second region of the printed circuit board, is formed by a narrow conductor track with a width of from 0.3 mm to 0.8 mm and preferably of approximately 0.5 mm in order to form a suitable coil.

The first sections of the coil are each arranged in a suitable manner with a first spacing of from 0.1 mm to 0.5 mm, and preferably of 0.3 mm. The second sections of the coil are each advantageously arranged with a second spacing which is 2 to 10 times, and preferably 5 times, the first spacing in order to provide desirable magnetic coupling.

The signal line extends, in the second region, in a suitable manner with the turns of its coil in a spiral as far as the center of the coil and then runs onto an opposite second side of the printed circuit board. The signal line extends, on the second side, in the second region centrally as far as into the first region of the printed circuit board, which first region, on the second side of the printed circuit board, adjacent to the first edge of the printed circuit board and to the cable connection for providing a desirable impedance, is areally populated by a third reference ground.

The second region for the impedance matching can vary in length without adversely affecting operation. However, in the first region with the antenna, size, and distance from the second region are critical for operation.

The antenna having the above-described features is designed as a near-field antenna for coupling in a range of from 2 to 3 cm. With these features, the antenna has an advantageous feed point impedance of 50Ω at the cable connection and is designed for a frequency band of 5 GHz with a transfer rate of 450 Mbit/s. The antenna is therefore suitable for providing a high-speed WLAN Ethernet data interface.

For simple assembly of the antenna, the printed circuit board has, in the first region adjacent to the cable connection, a first and a second continuous hole which respectively extend through the first and the third reference ground and the second and the third reference ground. It is clear that the abovementioned reference grounds provided on the printed circuit board are electrically connected to a reference ground of the cable connection.

The first and the second hole are, together with in each case one first and one second spacer element, which are designed as metal sleeves, for assembling the antenna, provided in a suitable housing described herein which can advantageously be a module, in particular, for example, of a plug-in connector.

Some embodiments relate to a module with an integrated WLAN Ethernet data interface having a suitable antenna, which is suitable for use in a module support and therefore for a large number of applications.

In some embodiments, the antenna may be advantageously arranged in the module in such a way that it projects out of an opening in the module by a predetermined amount and that, by a first module with a first antenna and a second structurally identical module which is rotated through 180° and has a second antenna and is arranged adjacent to the first module in one plane, the magnetic coupling state of the antennas is provided by an adjacent arrangement of the regions of the first and the second antenna that project out of the opening in the module.

The antenna of the module may be a planar antenna and an above-described antenna provided on a printed circuit board, wherein the region projecting out of the opening in the module is the third region of the antenna.

In a manner suitable for this purpose, the antenna, by way of its printed circuit board, is arranged in the module in a manner spaced apart from a central region of the opening in such a way that the antennas of the modules are each arranged parallel to the plane of the modules. In some embodiments, the above-described third regions of the antennas may be arranged adjacent to one another with a spacing of 1 to 10 mm and advantageously of approximately 2.5 mm without touching.

For the abovementioned positioning of the antenna in the module, the module has a housing which is suitable for this purpose and a shielding element.

The shielding element advantageously comprises of metal. The antenna is fastened in the shielding element in a suitable manner via its holes through the reference grounds and the spacer elements in such a way that the reference grounds of the antenna and a reference ground of the cable connection of the antenna are electrically connected to the shielding element.

The housing of the module consists, in suitable manner, of plastic and has an inner contour which interacts in a positively locking manner with an outer contour of the shielding element in such a way that the shielding element is accommodated and held in the housing. The housing has, in a suitable manner, an outer contour which corresponds to a contour of the module support.

For particularly accurate, reliable, and secure positioning of the antenna in the module and for particularly safe use of the module even outdoors, the module has a positioning element and/or a protective cap.

The above-described module is particularly suitable for use together with further structurally identical modules and/or further modules in a plug-in connector, wherein the module support is a holding frame of the plug-in connector, which holding frame corresponds to the module.

A holding frame of a plug-in connector can be designed to receive a large number of modules, whereby the holding frame can also receive more than one above-described module with an integrated WLAN Ethernet data interface.

By providing more than one such module, a data transfer rate of a high-speed WLAN Ethernet data transfer can be scaled in a simple manner. With three modules, which are each designed for a data transfer rate of 450 Mbit/s, a data transfer rate of more than 1 Gbit/s can be achieved in this way. Here, the modules can each be used for one frequency channel of a frequency band in a suitable manner.

The above-described module is also suitable for use together with further structurally identical modules and/or further modules in an electric coupler of a coupler part of a coupler which is provided between two train sections that are connected to each other, wherein the module support is a constituent part of the electric coupler.

As in a plug-in connector, more than one abovementioned module can also be provided in the electric coupler, whereby a desirable data transfer rate can be scaled in a simple manner by the module.

In some embodiments, above-described module may be suitable as a replacement for existing interfaces for radiofrequency signal transmission and data transfer by plug-in connections even in electric couplers for trains and in the process can be retrofitted and scaled in a simple manner.

Further features and advantages of the above-described module are described below with reference to the drawings.

BRIEF DESCRIPTION OF THE SEVERAL VIEWS OF THE DRAWINGS

Embodiments of the present disclosure are illustrated in the drawings and will be explained in more detail below.

Some of the figures contain simplified, schematic illustrations. Identical reference signs are sometimes used for elements which are similar but may not be identical. The reference signs are not all indicated in all of the drawings. Different views of similar elements can be drawn to different scales.

DETAILED DESCRIPTION

Figure 1:
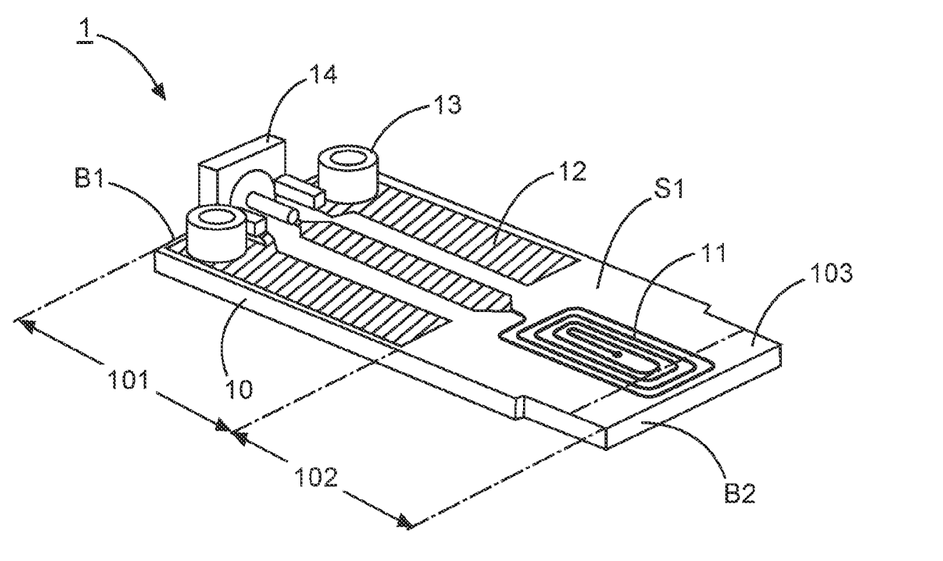
FIG. 1A shows an antenna in the coupling state with a second antenna.
FIG. 1B shows coils of the antennas from FIG. 1A from an alternative perspective.
Figure 1A:
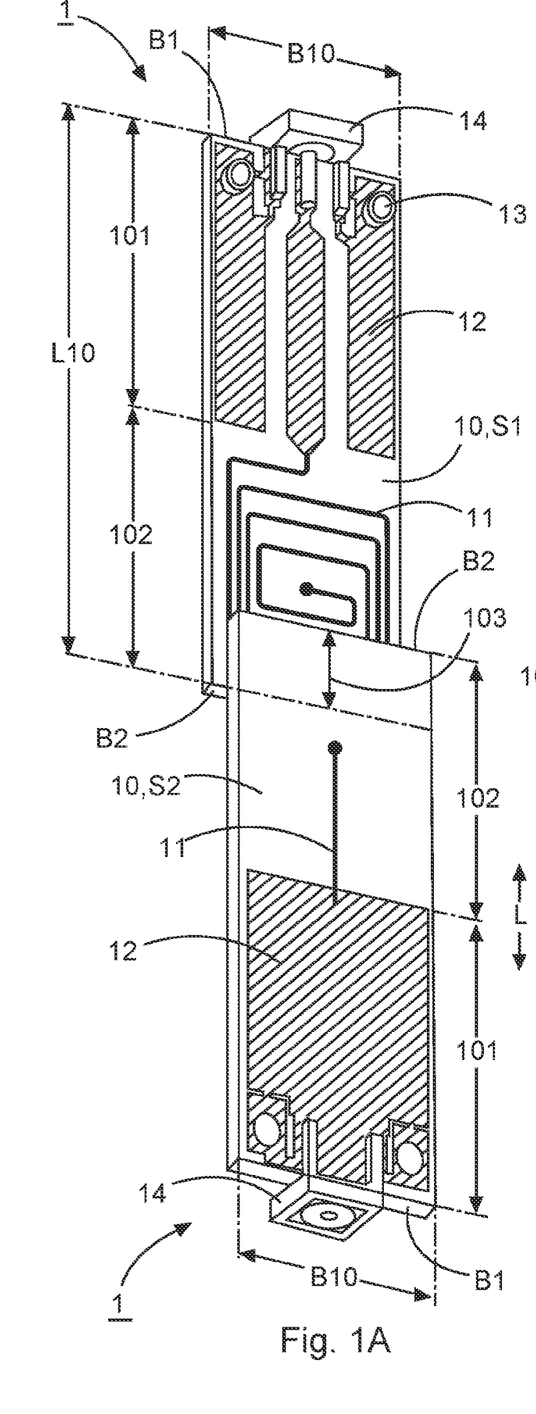

FIG. 1A shows an antenna 1 according to one embodiment of the present disclosure in the coupling state with a second structurally identical antenna 1. The antenna 1 has a rectangular printed circuit board 10 with a length L10 and a width B10. A broad-side first edge B1 of the printed circuit board 10 has provided on it a cable connection 14, arranged centrally on the edge B1, for a coaxial cable, starting from which a signal line 11 extends, on one side S1 of the printed circuit board 10, in the longitudinal direction L of the printed circuit board 10 parallel to the two longitudinal-side edges of the printed circuit board 10.

The signal line 11 extends, in a first region 101 of the printed circuit board 10, centrally between two reference grounds 12 which, like the signal line 11, likewise extend, starting from the cable connection 14, in the longitudinal direction L parallel to the two longitudinal-side edges of the printed circuit board 10. Here, the two reference grounds 12 are arranged adjacent to the two longitudinal-side edges of the printed circuit board 10.

In the first region 101, a first width of the signal line 11, a spacing of the signal line 11 from the reference grounds 12 and a second width of the reference grounds 12 are each designed in such a way that the first region 101 is populated by the signal line 11 and the reference grounds 12. The signal line 11 has, in this region, a width of approximately 3 mm and a spacing from the reference grounds 12 of approximately 2 mm. The width of the reference grounds 12 is greater than the width of the signal line 11 and corresponds to approximately 4.5 mm. Typically, the reference grounds 12 are areally designed in the form of a rectangle extending in the longitudinal direction L of the printed circuit board 10 here.

The signal line is 3 mm wide, the spacing from the first and second reference grounds is 2 mm and the width of the reference grounds is 4.3 mm. All of this, together with the printed circuit board thickness of approximately 1.6 mm and a standard printed circuit board material, results in a 50 ohm impedance. Specifying individual cited properties in relation to one another does not result in targeted impedance specification.

Adjacent to the cable connection 14, the printed circuit board 10 has a respective hole in the reference grounds 12, a spacer element 13 being arranged on the side S1 of the printed circuit board 10 at each of the holes. The holes and the spacer elements 13 are provided for fastening and positioning the printed circuit board 10, such as in a module M described below.

The above-described first region 101 extends in the longitudinal direction L approximately as far as the center of the printed circuit board 10. There, a second region 102 of the printed circuit board 10 adjoins the first region 101. It is clear that the signal line 11 and the reference grounds 12 are each designed as conductor tracks on the printed circuit board 10, the conductor tracks having an above-described areal extent in the first region 101.

In the second region 102, the signal line 11 is a great deal narrower than the rectangular, planar, and spiral coil 11 which, in this embodiment of the antenna 1, has four turns. Here, the turns of the coil 11 each have first sections 111 and second sections 112 which are formed perpendicularly in relation to one another. The sections 111 are each parallel in relation to one another and in relation to the longitudinal direction L of the printed circuit board 10 here.

In this embodiment of the antenna 1, the coil 11 is designed in such a way that the first sections 111 of the first turn of the coil 11 are arranged adjacent to the two opposite longitudinal-side edges of the printed circuit board 10. Here, a second section 112 of the first turn of the coil 11 is arranged parallel and adjacent to that edge B2 of the printed circuit board 10 situated opposite the cable connection 14.

The signal line 11 extends, starting from its above-described first turn, in the second region 102 with the turns of its coil 11 in a spiral as far as the center of the planar spiral coil 11 and then runs onto the other side S2 of the printed circuit board 10. On the side S2, the signal line 11 extends in the region 102 centrally in the longitudinal direction L as far as into the first region 101 which, adjacent to the first edge B1 of the printed circuit board 10 and the cable connection 14, is areally occupied by a third reference ground 12. The first region 101 and the second region 102 are approximately of the same size in a suitable manner in this embodiment of the antenna 1.

The two antennas 1 from FIG. 1A are arranged, as stated above, in their coupling state and in this case each with their region 103 situated opposite the cable connection 14 adjacent and one above the other. In this case, the first sides S1 of the antennas with the coils 11 are arranged adjacent to one another and the antennas 1 are rotated through 180° in relation to one another transversely to the longitudinal direction L. In a suitable manner, the antennas 1 are arranged with the smallest possible spacing, which can correspond, for example, approximately to the thickness of their printed circuit board 10, without touching. The printed circuit boards 10 may be, in a suitable manner, standard printed circuit boards with a thickness of 1.6 mm.

Figure 1B:
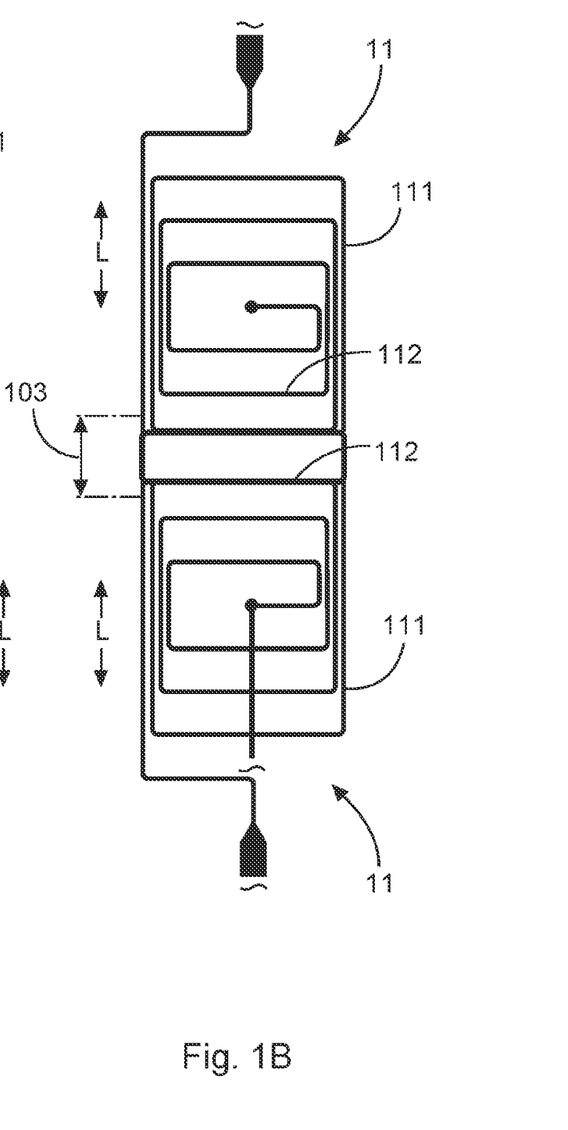

FIG. 1B shows, in this respect, the coils 11 of the antennas 1 from FIG. 1A from a different perspective with the coils 11 which are arranged adjacent and one above the other and each have the first turn sections 111 and the second turn sections 112, wherein, in this embodiment of the antenna 1, in each case two second turn sections 112 are arranged in such a way that magnetic coupling is typically provided.

In a suitable manner, for this purpose, the signal line 11 of the coil 11 is formed by a conductor track with a width of 0.3 mm to 0.8 mm and preferably of approximately 0.5 mm. Here, the first sections 111 are each arranged, in a suitable manner, at a distance of from 0.1 mm to 0.5 mm and preferably of approximately 0.3 mm, while the spacing of the second sections 112, such as in the region 103 of interest for coupling, is comparatively larger and preferably approximately 5 times the spacing of the first sections 111. In this embodiment, the spacing of the second sections 112 is approximately 1.5 mm in a suitable manner.

The spacing of the conductor tracks in the region 112 is approximately 1.5 mm and is therefore approximately 5 times greater than the spacing in the region 111 (which is 0.28 mm). The conductor track width is 0.52 mm.

In this embodiment, the region 103 is designed, by way of example, in such a way that a magnetic coupling state of the antennas 1 with in each case two second sections 112 of the coil 11 which are arranged adjacent to one another, which magnetic coupling state is suitable for radiofrequency transfer, is provided, namely by a second section 112 of the first turn of the coil 11 and a second section 112, which is adjacent to this section 112, of the turn which is adjacent to the first turn of the coil 11. It is clear that the region 103 can also advantageously be designed in such a way that a coupling state of the antennas 1 which is suitable for radiofrequency transfer is provided by more than two second sections 112 of the coil 11 which are arranged adjacent to one another.

The antenna 1 having the above-described features is designed as a near-field antenna for coupling in a range of from 2 to 3 cm and is suitable for a high-speed WLAN Ethernet data interface. The antenna 1 having these features has an impedance at its cable connection of 50Ω and is designed for a frequency band of 5 GHz with a transfer rate of 450 Mbit/s. An above-mentioned antenna 1 is particularly suitable for integration into a module M described below.

Figure 2:
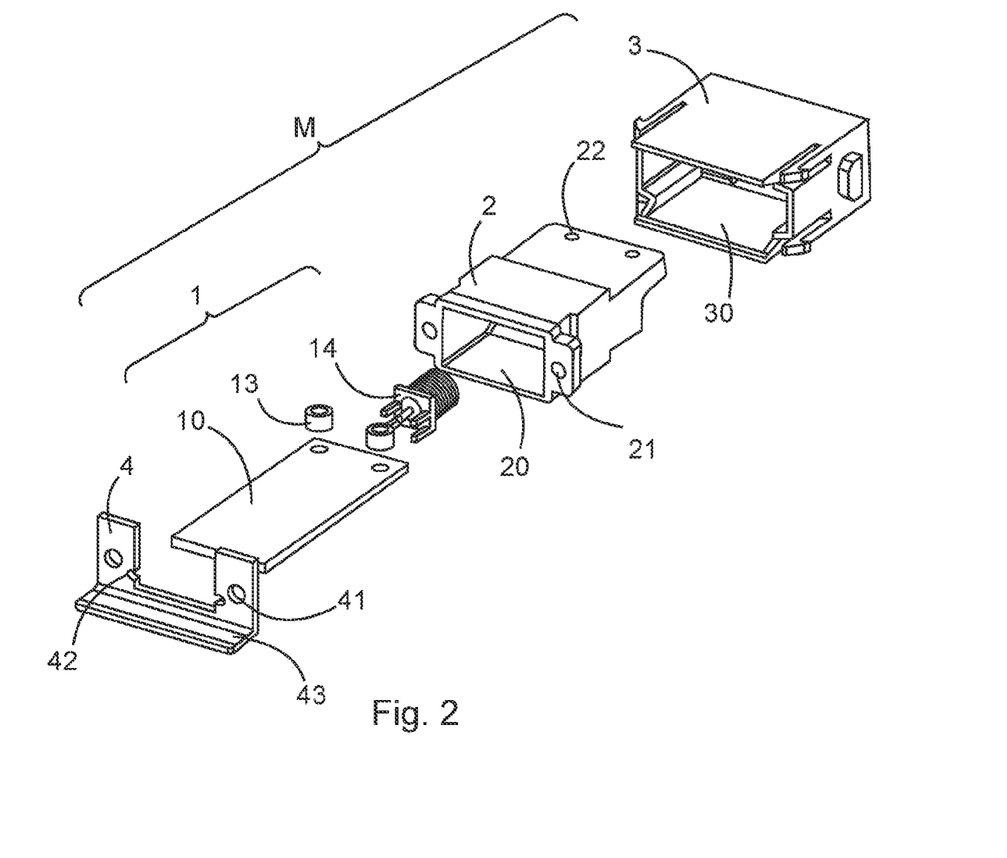
FIG. 2 shows an exploded illustration of a module according to one embodiment of the present disclosure together with an enlarged illustration of the antenna of the module from an alternative perspective.

FIG. 2 shows an exploded illustration of a module M according to one embodiment having a module housing 3, a shielding element 2, an antenna 1, and a positioning element 4.

The printed circuit board 10 of the antenna 1 is only schematically illustrated in the exploded illustration, and therefore the antenna 1 with its printed circuit board 10, its cable connection 14 and the two spacer elements 13 assembled as intended is also illustrated on an enlarged scale from a different perspective. The design of the antenna 1 from FIG. 2 substantially corresponds to the above-described design of the antenna 1 from FIG. 1A, and therefore reference is made to the corresponding description of FIG. 1A in this respect.

In contrast to the embodiment from FIG. 1A, the coil 11 is of narrower design, and the two longitudinal-side edges of the printed circuit board 10 each have in the region 103, a step, following which the region 103 of the printed circuit board 10 is of correspondingly tapered design. The above-mentioned tapering is not illustrated in the exploded illustration containing the schematic printed circuit board 10 for reasons of simplicity.

The module M, with its housing 3, is provided for a suitable module support 6 and designed in a corresponding manner. The module support 6 can be a holding frame 6, such as a plug-in connector. For this purpose, the housing 3 has an outer contour which corresponds in a positively locking manner with the holding frame 6 and has suitable latching and holding elements. The assembled module M inserted into the holding frame 6 is described below with reference to FIG. 3B.

The housing 3 has an opening 30 and an inner contour which interacts in a positively locking manner with an outer contour of the shielding element 2 in such a way that the shielding element 2 inserted into the housing 3 via the opening 30 is accommodated and held in the housing 3 as intended. The housing 3 comprises plastic in a suitable manner.

The shielding element 2 comprises metal in a suitable manner and has, as stated above, an outer contour which is positively locked with the inner contour of the housing 3. The shielding element 2 provides a suitable support element for receiving and accommodating the antenna 1 in the module M.

For this purpose, the shielding element 2 has an opening 20 and two threaded holes 22 which correspond to the spacer elements 13 provided at the holes of the printed circuit board 10 in such a way that the printed circuit board 10 of an antenna 1 inserted into the shielding element 2 via the opening 20 can be positioned and fastened as intended to the threaded holes and in the shielding element 2 by screws, not illustrated in the drawings and guided through the holes in the printed circuit board 10 and the spacer elements 13. The spacer elements 13 are designed as metal sleeves in a suitable manner for this purpose, and therefore electrical contact between the reference grounds 12 of the antenna 1 and of the cable connection 14 with the shielding element 2 is provided here.

It is clear that the shielding element 2 and the housing 3 each also have a rear-side opening which is provided opposite the openings 20, 30 and via which the above-described screws and also the cable connection 14 for a cable connection are each accessible. The cable connection 14 is designed as an SMA screw connection in a suitable manner for this purpose and is therefore typically suitable for a coaxial cable.

The shielding element 2 is designed in a flange-like manner with two threaded holes 21 on the outside of its opening 20, the threaded holes being suitable for fastening further elements, such as the positioning element 4 and/or a protective cap 5 described below with reference to FIG. 5B.

The positioning element 4 provides rail-like guidance and positioning of the antenna 1 and is designed with its two recesses 42 for receiving the printed circuit board 10. The positioning element 4 is provided, by way of its two holes 41, for fastening to the flange-like edge of the opening 20 of the shielding element 2, and can be fastened as intended to the shielding element 2 by corresponding screws, not illustrated, via the holes 41 and the threaded holes 21.

The positioning element 4 also has an angled region 43 with a dimension which corresponds substantially to a predetermined length with which the printed circuit board 10 of the antenna 1 fitted in the shielding element 2 projects, such as by way of its region 103 provided for coupling, out of the opening 20 of the shielding element 2. The angled portion 43 is provided for lateral protection of the printed circuit board 10 here.

The spacer elements 13 and the positioning element 4, by way of its recesses 42, are designed in such a way that the antenna 1 which projects out of the module M with a predetermined region 103, provided for coupling the antenna 1, out of the opening 20 is spaced apart acentrically from a central region of the modules M here. This spacing is designed in such a way that a first module M and a second structurally identical module M rotated through 180°, by way of their antennas 1 projecting out of the modules M, can be moved to a coupling state of the antennas 1 which allows high-speed WLAN Ethernet data transfer.

Figure 3A:
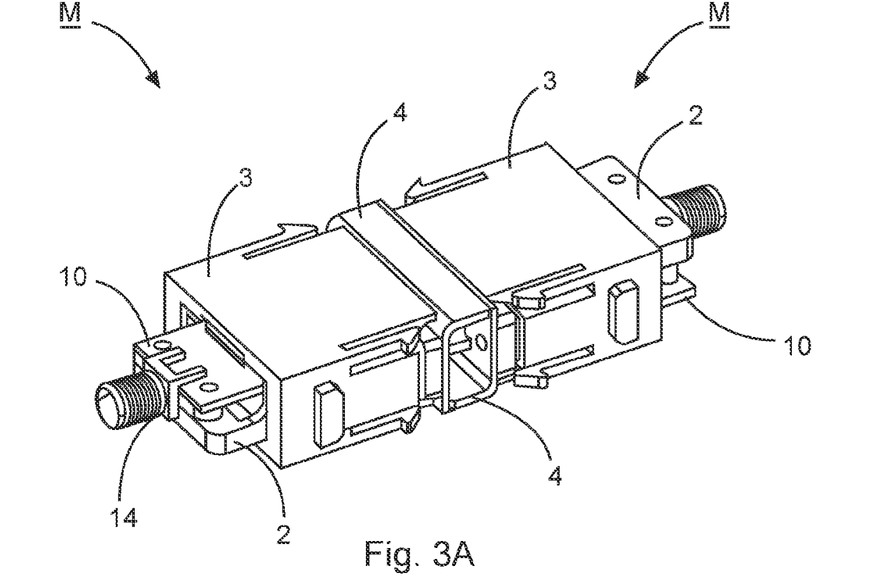
FIG. 3A shows two assembled modules from FIG. 2 in the coupling state of their antennas.

FIG. 3A shows two assembled modules M from FIG. 2 in the coupling state of their antennas 1, wherein, in this state, the regions 103 of the antennas 1 are arranged adjacent to one another without contact and are protected on two opposite sides by the angled regions 43 of the positioning elements 4. This drawing also shows the rear-side opening in the housing 3 already described above with reference to FIG. 2 together with the cable connection 14 which is accessible for connection of a cable and is provided as an SMA connection with a screw connection. The structurally identical modules M that are each rotated through 180° in relation to one another are arranged in one plane here.

Figure 3B:
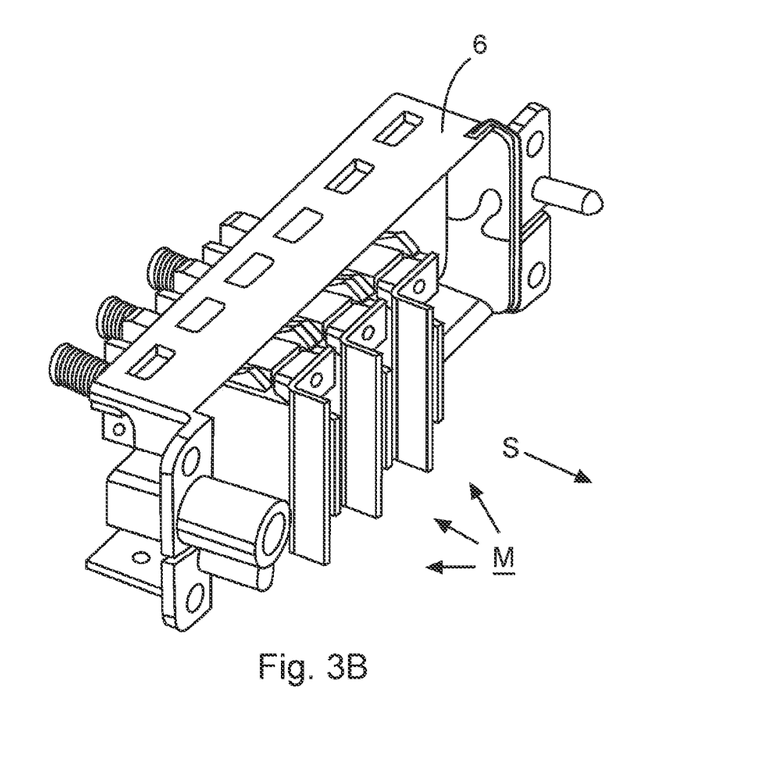
FIG. 3B shows three modules in a module support.

FIG. 3B shows, by way of example, three modules M in a first holding frame 6 which is suitable for a modular plug-in connector and which is designed for receiving six modules. The holding frame 6 is designed as an articulated frame and is schematically illustrated in a simplified manner in the drawing. The outer contour of the modules M corresponds to contour elements of the holding frame 6 in such a way that the modules M are fixed in the holding frame 6.

The holding frame 6 can receive a further three modules which can be designed differently and which can be configured to transmit, for example, signals and currents of a digital, analog, electrical, pneumatic, mechanical, optical or hydraulic type.

By providing more than one module M, a data transfer rate of a high-speed WLAN Ethernet data transfer can be scaled in a simple manner. With the three modules M, which can each be designed for a data transfer rate of 450 Mbit/s, a data transfer rate of more than 1 Gbit/s can be achieved in this way. Here, the modules M are each used for one frequency channel of a frequency band in a suitable manner.

The holding frame 6 can be inserted and fixed into a housing of a plug-in connector as intended. A second structurally identical holding frame 6 can likewise hold three modules M in a manner rotated through 180° in positions which correspond to the positions of the three modules M, the three held modules corresponding to the modules M and in the process being correspondingly rotated through 180° in order to be coupled as intended. The second holding frame 6 can be inserted and fixed into a housing of a mating plug-in connector that corresponds to the plug-in connector housing.

The modules M are designed in a manner corresponding to the retaining frame 6 in such a way that the modules M fixed in the first and the second retaining frame 6, when the plug-in connector is connected as intended in its insertion direction S to the mating plug-in connector, the position, described above with reference to FIG. 3A, of a coupling state of the antennas 1 of the modules M is provided. Here, the regions 103, which project out of the modules M in the insertion direction S, of the printed circuit boards 10 are, with the coils 11 of two corresponding modules M arranged opposite each other, arranged adjacent to one another as intended and in the process have a predetermined small spacing.

Figure 4:
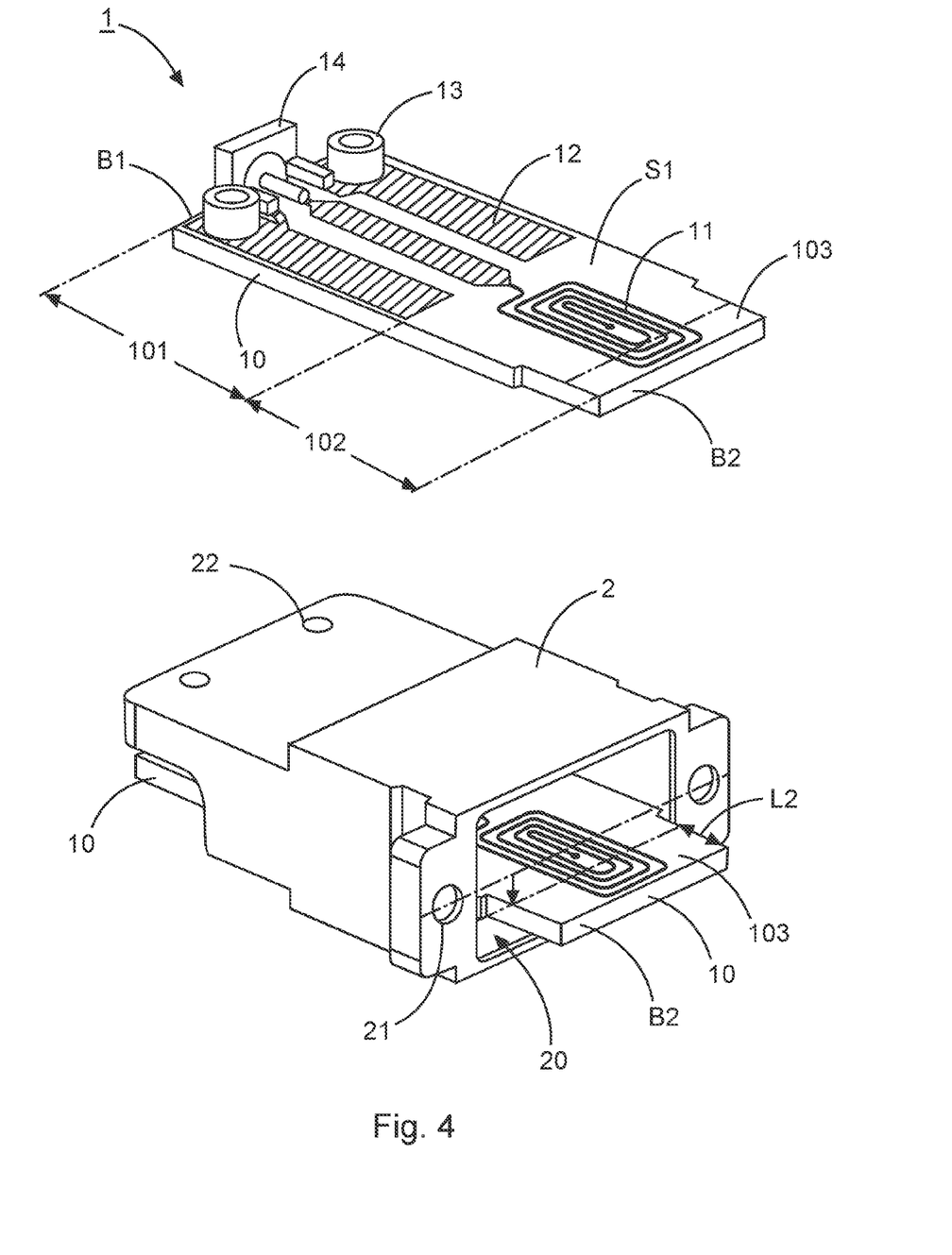
FIG. 4 shows an enlarged illustration of a shielding element of the module from FIG. 2 from an alternative perspective, with the antenna inserted into the shielding element.

FIG. 4 shows, for better understanding of the module M, an enlarged illustration of the shielding element 2 of the module M from FIG. 2 from a different perspective. The antenna 1 from FIG. 2 is inserted into the shielding element 2 as intended, and for this reason the antenna 1 is likewise illustrated in overview in FIG. 4 once again without the shielding element 2 for reasons of clarity and convenience.

The printed circuit board 10 of the antenna 1 projects out of the opening 20 in the shielding element 2 by a predetermined quantity L2 in the connecting direction S of the module M to a corresponding structurally identical second module M rotated through 180°, the opening being surrounded by the flange-like edge with the two threaded holes 21. The printed circuit board 10 also projects, by way of its end situated opposite the opening 20 and its cable connection 14, out of the rear-side opening in the shielding element 2.

Adjacent to the cable connection 14, the printed circuit board 10 is fastened to the threaded holes 22 in the shielding element 2 by screws, wherein the printed circuit board 10 is spaced apart from a central region of the opening 20 as intended via the spacer elements 13, the central region being illustrated in the drawing by the dash-and-dot line which extends transversely to the opening 20 and through the threaded holes 21.

Here, the antenna 1 is arranged in the shielding element 2 in such a way that its printed circuit board 10 extends parallel to the connecting direction S of the module M. The above-described spacing from the central region of the opening 20 is selected in a predetermined manner in such a way that the printed circuit boards 10 of two modules M arranged in their coupling state are arranged adjacent to one another with a predetermined slight spacing and do not touch in the process.

It is clear that the connecting direction S of the modules M for providing their coupling state corresponds to the insertion direction S of a plug-in connector having the modules M. The modules M are designed with their antennas 1 positioned in the shielding elements 2 in such a way that the printed circuit boards 10 of the antennas 1 are arranged parallel to the connecting direction S or insertion direction S and the plane of the modules.

Figure 5A:
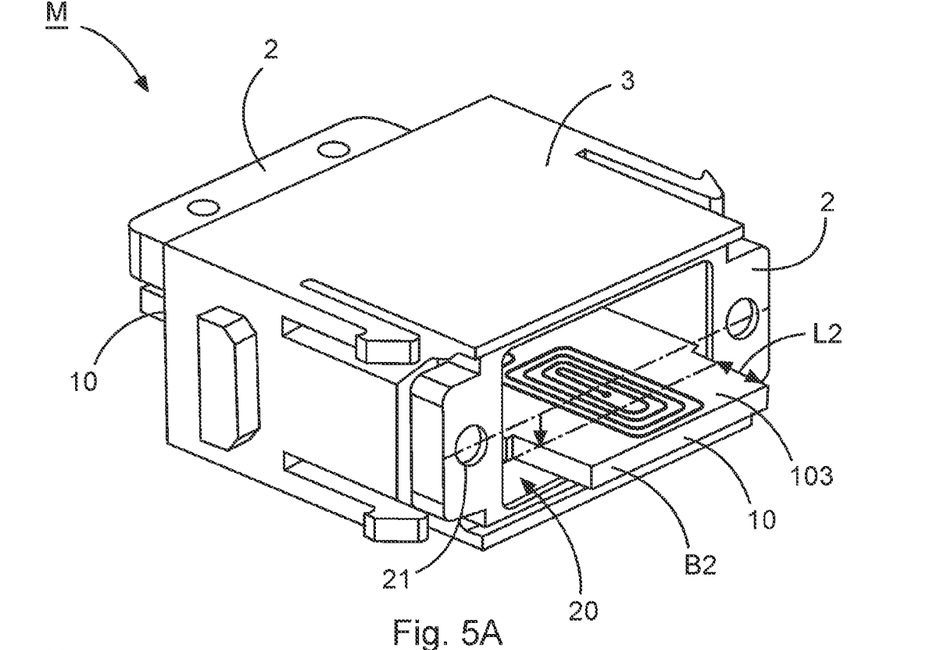
FIG. 5A shows the shielding element with the antenna inserted into the housing of the module from FIG. 2.

FIG. 5A shows, for better understanding of the module M, an enlarged illustration of the shielding element 2 with the antenna 1 inserted into the housing 3 of the module M from FIG. 2. The shielding element 2 projects, together with the printed circuit board 10, out of the rear-side opening in the housing 3. Only an upper and the lower edge of the housing 3 project slightly beyond the flange-like edge of the opening 20 in the shielding element 2 in the connecting direction S.

Figure 5B:
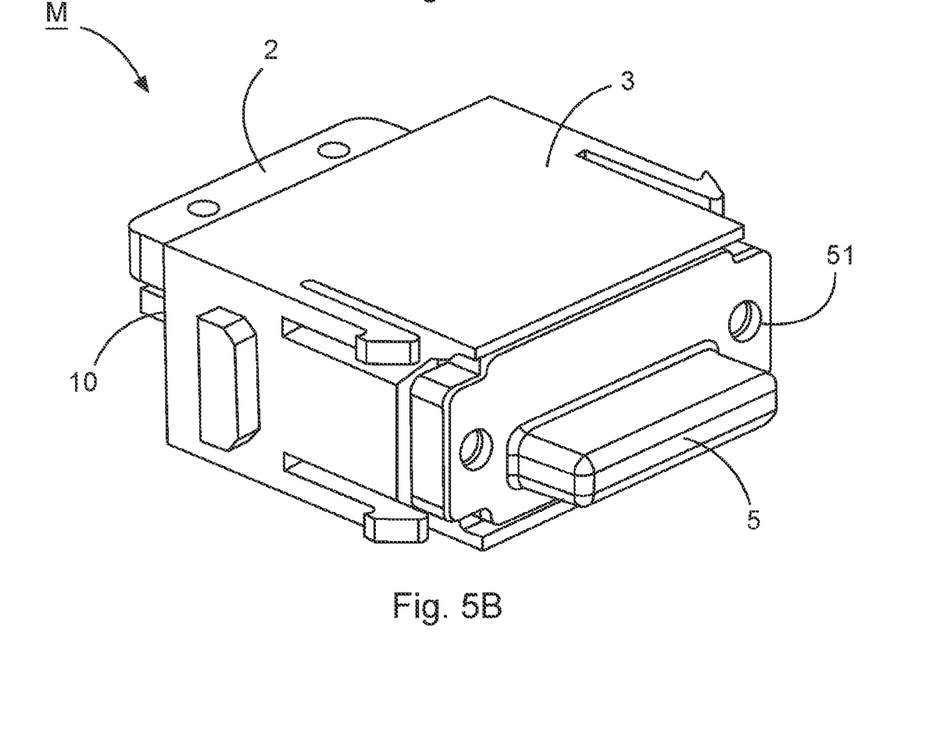
FIG. 5B shows the module from FIG. 5A provided with a protective cap.

FIG. 5B shows the module M from FIG. 5A, the opening 20 in which is provided with a protective cap 5. The protective cap 5 is produced from a suitable plastic and has an advantageous dual function. Firstly, it protects the region 103 of the antenna 1 against soiling, and also stabilizes, like the positioning element 4, the printed circuit board 10 in its position. For this purpose, the protective cap 5 is likewise formed, like the edge of the opening 20, in a flange-like manner with two holes 51 which correspond to the threaded holes 21 in the shielding element 2, whereby the protective cap 5 can be fastened to the module M by screws. For this purpose, the protective cap 5 also corresponds in shape to the printed circuit board 10 projecting out of the opening 20.

It is clear that the module M can also have a protective cap 5 of this kind, in addition to the positioning element 4. It is also clear that the rear-side opening in the shielding element 2 can be provided with a suitably designed further protective cap taking into consideration the accessibility of the cable connection 14. It is likewise clear that a module M provided with the protective cap 5 is particularly suitable for sensitive sectors in industry or for outdoor use.

Figure 6A:
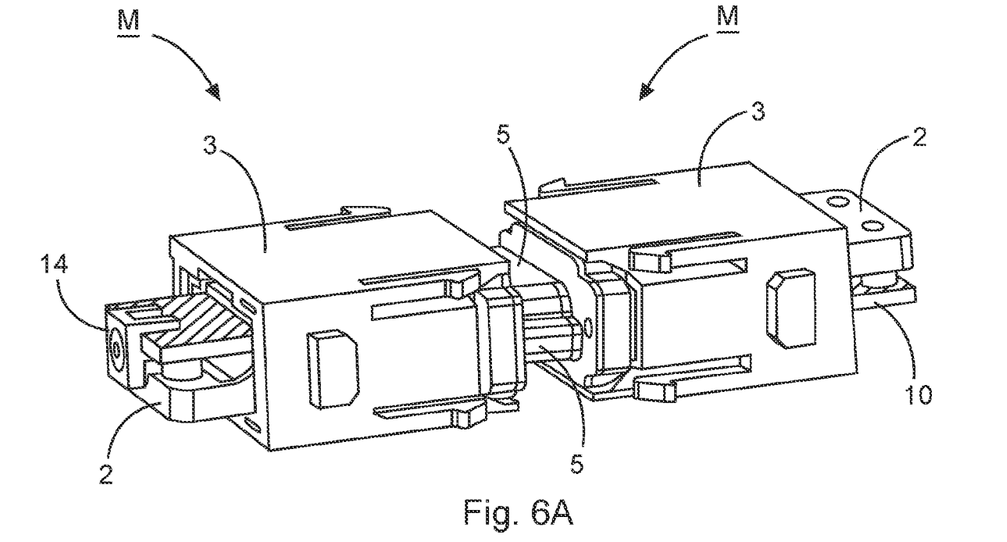
FIG. 6A shows two modules from FIG. 5B in the coupling state of their antennas.
Figure 6B:
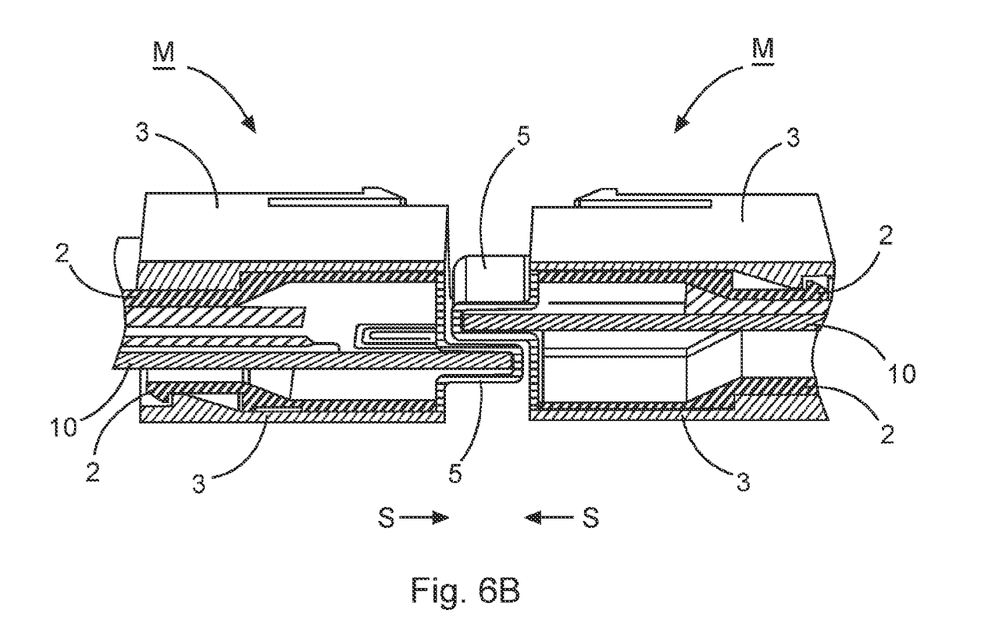
FIG. 6B shows a longitudinal section through the modules from FIG. 6A.

FIG. 6A shows two modules M from FIG. 5B in the coupling state of their antennas 1, and FIG. 6B shows a longitudinal section through the modules M from FIG. 6A.

FIG. 6A corresponds, with the two modules M arranged adjacent to one another in one plane in the connecting direction S of the modules M, substantially to FIG. 3A, and therefore reference is made to the above description in this respect here.

FIG. 6B firstly shows the shielding element 2 arranged in a positively locking manner in the housing 3. FIG. 6B shows the design of the protective cap 5 which, with its shape, incorporates the printed circuit board 10, wherein the protective cap 5 is designed in a manner corresponding to the printed circuit board 10 and is arranged adjacent to the printed circuit board 10 on three sides, i.e., adjacent to the first side S1 and the second side S2 and the corresponding end-side edge B2 of the printed circuit board 10.

Here, the modules M are arranged in their coupling state in such a way that the protective caps 5 have a slight spacing and do not touch in the process. The spacing of the printed circuit boards 10 transverse to the connecting direction S is of the order of magnitude of the thickness of the printed circuit boards 10 here and is between 1 and 10 mm and is advantageously approximately 2.5 mm.

The spacing of the antenna coils in the coupled state is approximately 2.5 mm. A smaller distance would be more advantageous, but is not easy to establish on account of the design of the shielding element.

Figure 7A:
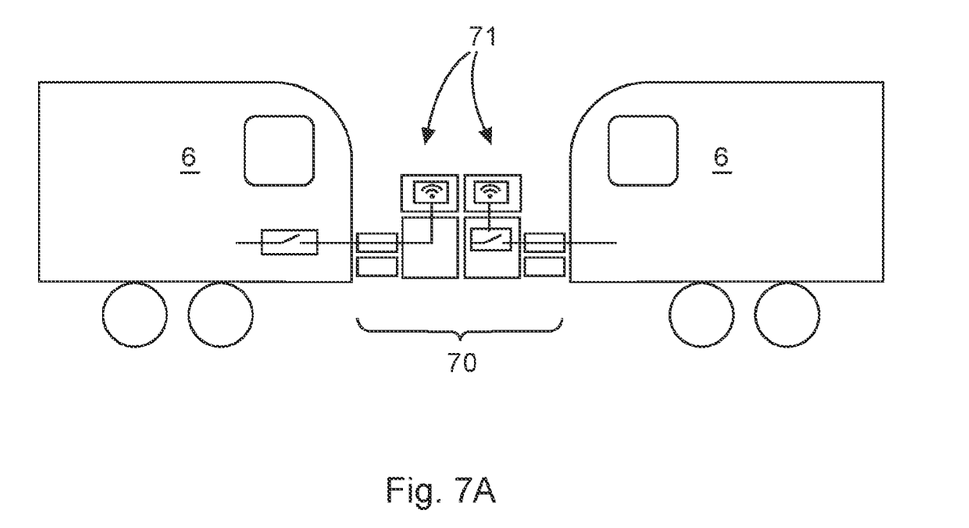
FIG. 7A shows two train sections with a coupler arranged between the two train sections.

FIG. 7A shows a schematic illustration of two train sections which are connected to one another and have a coupler 70 arranged between them. The two train sections each contain a railcar 7. The coupler 70 connects the two railcars 7 and in this case comprises two coupler parts which each comprise a mechanical coupler and an electric coupler 71, the electric coupler 71 being schematically illustrated in FIG. 7B.

Figure 7B:
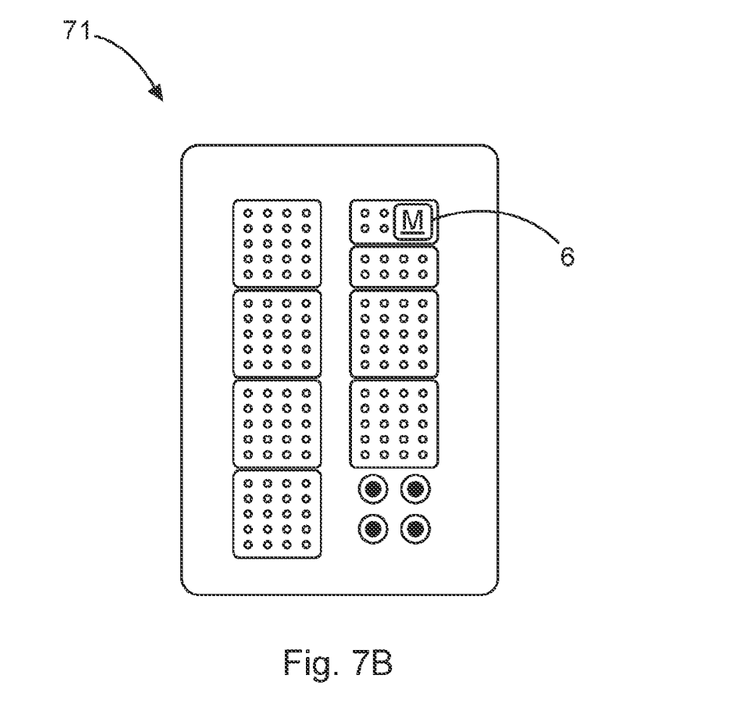
FIG. 7B shows a schematic illustration of an electric coupler of the coupler from FIG. 7A.

Both the mechanical coupler and the electric coupler 71 can be operated in an automated manner in modern trains in order to both establish a mechanical connection and provide electrical, hydraulic, and/or pneumatic connections required for control purposes when railcars of several train parts or else cars of one train part are coupled with one another. For this purpose, the electric coupler 71 usually has a large number of plug-in connections.

At least one above-described module M is integrated into a suitable module support 6 of the electric coupler 71, whereby radiofrequency data transfer is provided when the coupler 70 is closed. In this case, the radiofrequency coupling is performed by the modules M, which are each arranged in a coupler part of the electric coupler 71.

Even though various aspects or features of the disclosure are shown respectively in combination in the Figures, it is clear to a person skilled in the art—unless stated otherwise—that the illustrated and discussed combinations are not the only ones possible. In particular, mutually corresponding units or feature complexes from different exemplary embodiments can be exchanged with one another. In other words, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An antenna for a WLAN Ethernet data interface, comprising:
   a rectangular printed circuit board having a width and a length and a longitudinal direction, and having a first broad-side edge and a second broad-side edge situated opposite each other, and having a first region and a second region which extend in succession from the first broad-side edge to the second broad-side edge, and having a first side and a second side, and having a signal line and a reference ground provided by conductor tracks, wherein the signal line is designed as a planar coil on the first side in the second region, wherein the planar coil is designed as a spiral rectangular coil with at least one turn, wherein the turns of the spiral rectangular coil each have at least one first section parallel to the longitudinal direction of the printed circuit board and at least one second section transverse to the first section, wherein the second region on the first side includes a third region for providing a magnetic coupling state, which is suitable for data transfer, of a first antenna with a structurally identical second antenna, wherein the third region is arranged at the second broad-side edge and comprises at least one second section of the spiral rectangular coil;

wherein the third region is designed in such a way that the magnetic coupling state is provided by an adjacent arrangement of the third regions of the first and the second antenna, and wherein the first and second antennas are each rotated through 180° in relation to one another in the coupling state in such a way that the third regions face one another adjacently and oppositely.

2. The antenna of claim 1, wherein:

the signal line in the second region of the printed circuit board is formed by a conductor track with a width of 0.3 mm to 0.8 mm, the first sections of the coil are each arranged with a first spacing of 0.1 mm to 0.5 mm, and the second sections of the coil are each arranged with a second spacing which is 2 to 10 times the first spacing.

3. The antenna according to claim 2, wherein the signal line in the second region of the printed circuit board is formed by the conductor track with a width of approximately 0.5 mm, wherein the first sections of the coil are each arranged with a first spacing of approximately 0.3 mm, and wherein the second sections of the coil are each arranged with a second spacing which is 5 times the first spacing.

4. The antenna of claim 1, wherein the coil is designed with three to five turns.

5. The antenna of claim 1, wherein the third region arranged at the second broad-side edge comprises two or three second sections of the coil.

6. An antenna for a WLAN Ethernet data interface, comprising:

a rectangular printed circuit board having a width and a length and a longitudinal direction, and having a first broad-side edge and a second broad-side edge situated opposite each other, and having a first region and a second region which extend in succession from the first broad-side edge to the second broad-side edge, and having a first side and a second side, and having a signal line and a reference ground provided by conductor tracks, wherein the signal line is designed as a planar coil on the first side in the second region, wherein the second region on the first side includes a third region for providing a magnetic coupling state, which is suitable for data transfer, of a first antenna with a structurally identical second antenna, wherein the third region is designed in such a way that the magnetic coupling state is provided by an adjacent arrangement of the third regions of the first and the second antenna, wherein the first and second antennas are each rotated through 180° in relation to one another in the coupling state in such a way that the third regions face one another adjacently and oppositely, wherein the signal line extends, on the first side, starting from a cable connection which is arranged at the first broad-side edge of the printed circuit board, in the first region of the printed circuit board centrally between a first reference ground and a second reference ground which are arranged adjacent to the two longitudinal-side edges of the printed circuit board, and wherein, in the first region, a first width of the signal line, a spacing of the signal line from the first and the second reference ground, and a second width of the reference grounds are each designed in such a way that the first region is populated by the signal line and the reference grounds.

7. The antenna of claim 6, wherein the signal line has, in the first region of the printed circuit board, a width which corresponds to approximately a spacing of the signal line from the first and the second reference ground, wherein the width of the reference grounds corresponds to approximately 1.2 to 2 times the width of the signal line, and wherein the first and the second reference ground are areally designed in the form of a rectangle extending in the longitudinal direction of the printed circuit board.

8. The antenna according to claim 7, wherein the width of the reference grounds corresponds to approximately 1.5 times the width of the signal line.

9. An antenna for a WLAN Ethernet data interface, comprising:

a rectangular printed circuit board having a width and a length and a longitudinal direction, and having a first broad-side edge and a second broad-side edge situated opposite each other, and having a first region and a second region which extend in succession from the first broad-side edge to the second broad-side edge, and having a first side and a second side, and having a signal line and a reference ground provided by conductor tracks, wherein the signal line is designed as a planar coil on the first side in the second region, wherein the second region on the first side includes a third region for providing a magnetic coupling state, which is suitable for data transfer, of a first antenna with a structurally identical second antenna, wherein the third region is designed in such a way that the magnetic coupling state is provided by an adjacent arrangement of the third regions of the first and the second antenna, wherein the first and second antennas are each rotated through 180° in relation to one another in the coupling state in such a way that the third regions face one another adjacently and oppositely, wherein the signal line extends, in the second region, with the turns of the coil in a spiral as far as the center of the coil and then runs onto the second side of the printed circuit board, and wherein the signal line extends, on the second side, from the second region centrally as far as into the first region which, adjacent to the first edge of the printed circuit board, is areally populated by a third reference ground.

10. An antenna for a WLAN Ethernet data interface, comprising:

a rectangular printed circuit board having a width and a length and a longitudinal direction, and having a first broad-side edge and a second broad-side edge situated opposite each other, and having a first region and a second region which extend in succession from the first broad-side edge to the second broad-side edge, and having a first side and a second side, and having a signal line and a reference ground provided by conductor tracks, wherein the signal line is designed as a planar coil on the first side in the second region, wherein the second region on the first side includes a third region for providing a magnetic coupling state, which is suitable for data transfer, of a first antenna with a structurally identical second antenna, wherein the third region is designed in such a way that the magnetic coupling state is provided by an adjacent arrangement of the third regions of the first and the second antenna, wherein the first and second antennas are each rotated through 180° in relation to one another in the coupling state in such a way that the third regions face one another adjacently and oppositely, wherein the printed circuit board of the antenna has, in the first region adjacent to the first edge, a first continuous hole through the first and the third reference ground and a second continuous hole through the second and the third reference ground, and wherein the first and the second continuous holes are, together with in each case one first and one second spacer element, which are designed as metal sleeves, for assembling the antenna in a housing.

11. An antenna for a WLAN Ethernet data interface, comprising:

a rectangular printed circuit board having a width and a length and a longitudinal direction, and having a first broad-side edge and a second broad-side edge situated opposite each other, and having a first region and a second region which extend in succession from the first broad-side edge to the second broad-side edge, and having a first side and a second side, and having a signal line and a reference ground provided by conductor tracks, wherein the signal line is designed as a planar coil on the first side in the second region, wherein the second region on the first side includes a third region for providing a magnetic coupling state, which is suitable for data transfer, of a first antenna with a structurally identical second antenna, wherein the third region is designed in such a way that the magnetic coupling state is provided by an adjacent arrangement of the third regions of the first and the second antenna, wherein the first and second antennas are each rotated through 180° in relation to one another in the coupling state in such a way that the third regions face one another adjacently and oppositely, wherein the antenna is designed as a near-field antenna for coupling in a range of 2 to 3 cm, wherein the antenna has an impedance at the cable connection of 50Ω and is designed for a frequency band of 5 GHz with a transfer rate of 450 Mbit/s, and wherein the antenna is configured for providing a WLAN Ethernet data interface.

12. A module with an integrated WLAN Ethernet data interface, the module comprising:

a housing;

a shielding element;

a positioning element or a protective cap; and a planar antenna formed on a printed circuit board having a signal line and a reference ground for use in a module support, wherein the antenna is arranged in the module and in the process projects out of an opening in the module by a predetermined amount in such a way that, by a first module with a first antenna and a second structurally identical module which is rotated through 180° and has a second antenna and is arranged adjacent to the first module in one plane, a magnetic coupling state of the signal lines of the antennas is provided by an adjacent arrangement of the first and the second antennas.

13. The module of claim 12, wherein the antenna, by way of the printed circuit board, is spaced apart from a central region of the opening, and the printed circuit board is arranged parallel to the plane of the modules.

14. The module of claim 12, wherein the shielding element comprises metal and is electrically connected to the reference ground of the antenna and a reference ground of a cable connection of the antenna.

15. The module of claim 12, wherein the housing comprises plastic and has an inner contour which interacts in a positively locking manner with an outer contour of the shielding element in such a way that the shielding element is accommodated and held in the housing, and wherein the housing has an outer contour which corresponds to a contour of the module support.

16. The module of claim 12 wherein the module is configured for use together with further structurally identical modules or further modules in a plug-in connector, wherein the module support is a holding frame of the plug-in connector.

17. The module of claim 12 wherein the module is configured for use together with further structurally identical modules or further modules in an electric coupler of a coupler part of a coupler which is provided between two train sections that are connected to each other, and wherein the module support is a constituent part of the electric coupler.

18. A module with an integrated WLAN Ethernet data interface, the module comprising:

a housing;

a shielding element;

a positioning element or a protective cap; and an antenna, the antenna comprising:

a rectangular printed circuit board having a width and a length and a longitudinal direction, and having a first broad-side edge and a second broad-side edge situated opposite each other, and having a first region and a second region which extend in succession from the first broad-side edge to the second broad-side edge, and having a first side and a second side, and having a signal line and a reference ground provided by conductor tracks, wherein the signal line is designed as a planar coil on the first side in the second region, wherein the second region on the first side includes a third region for providing a magnetic coupling state, which is suitable for data transfer, of a first antenna with a structurally identical second antenna, wherein the third region is designed in such a way that the magnetic coupling state is provided by an adjacent arrangement of the third regions of the first and the second antenna, wherein the first and second antennas are each rotated through 180° in relation to one another in the coupling state in such a way that the third regions face one another adjacently and oppositely.

\* \* \* \* \*